United States Patent [19]
Holthaus et al.

[11] Patent Number: 5,838,804
[45] Date of Patent: Nov. 17, 1998

[54] APPARATUS AND METHOD FOR PROVIDING PROPER MICROPHONE DC BIAS CURRENT AND LOAD RESISTANCE FOR A TELEPHONE

[75] Inventors: James R. Holthaus, Omaha, Nebr.; David L. Dilley, Ft. Collins, Colo.

[73] Assignee: Transcrypt International, Inc., Lincoln, Nebr.

[21] Appl. No.: 693,389

[22] Filed: Aug. 7, 1996

[51] Int. Cl.⁶ ........................................... H04R 3/00
[52] U.S. Cl. ............................. 381/111; 379/387
[58] Field of Search ................... 379/387, 395; 381/111, 112, 113, 114

[56] References Cited

U.S. PATENT DOCUMENTS

| | | |
|---|---|---|
| 2,877,302 | 3/1959 | Radomski et al. . |
| 3,249,698 | 5/1966 | Benmussa et al. . |
| 3,277,243 | 10/1966 | Fairbairn . |
| 3,772,592 | 11/1973 | Rhodes . |
| 3,976,849 | 8/1976 | Champan . |
| 4,178,486 | 12/1979 | Young . |
| 4,491,694 | 1/1985 | Harmeyer . |
| 4,893,331 | 1/1990 | Horiuchi et al. . |
| 4,918,726 | 4/1990 | Snyder ................................ 381/111 |
| 5,036,536 | 7/1991 | Hanon et al. ........................ 381/111 |
| 5,058,155 | 10/1991 | Larsen . |
| 5,099,514 | 3/1992 | Acree . |
| 5,140,631 | 8/1992 | Stahl . |
| 5,185,789 | 2/1993 | Hanon et al. . |
| 5,239,579 | 8/1993 | Schuh ................................... 381/111 |
| 5,333,177 | 7/1994 | Braitberg et al. . |
| 5,381,473 | 1/1995 | Andrea et al. ....................... 379/387 |
| 5,396,551 | 3/1995 | Lucey . |
| 5,398,287 | 3/1995 | Nuijten ................................ 379/395 |
| 5,673,325 | 9/1997 | Andrea et al. ...................... 379/387 |

*Primary Examiner*—Vivian Chang
*Attorney, Agent, or Firm*—Zarley,McKee,Thomte, Voorhees, & Sease

[57] ABSTRACT

An apparatus and method for providing proper bias current and load resistance for a telephone microphone regardless of the type of microphone used. Microphone bias voltage, if any exists at the microphone, is compared to a reference voltage selected to define a distinction between various types of microphones. If the bias voltage exceeds the reference voltage, an impedance matching the correlated type of microphone is interdicted on both sides of the microphone. If reference voltage exceeds bias voltage, a different impedance path is presented to match it with the type of correlated microphone. Therefore, the invention automatically provides proper bias current and load resistance for the microphone.

22 Claims, 1 Drawing Sheet

APPARATUS AND METHOD FOR PROVIDING PROPER MICROPHONE DC BIAS CURRENT AND LOAD RESISTANCE FOR A TELEPHONE

BACKGROUND OF THE INVENTION

A. Field of the Invention

The present invention relates to telephones, and particularly to accommodating different types of microphones for telephones, and more particularly, to a system for automatically providing proper microphone bias current and load resistance.

B. Problems in the Art

Like all technology, advances and expansions have occurred with regard to telephone equipment. A particular example involves the microphones or transmitters utilized with telephones. Carbon-type microphones have been used for a long time and remain an option. However, they have certain deficiencies. More modern electret and dynamic microphones overcome certain problems of carbon-type microphones, but have their own concerns, considerations, and characteristics. Other types of microphones for telephone use exist, and still further types can be anticipated to be developed in the future.

U.S. Pat. No. 5,185,789 to Hanon et al, recognizes this situation and discusses the different electrical characteristics presented by different types telephone microphones. Hanon et al. also recognize that different types of hand and headsets may be desired to be used with the same telephone base unit. Horiuchi et al U.S. Pat. No. 4,893,331, identifies that there are times when it is simply impossible to transmit the telephone user's voice using a microphone that is mismatched with the electrical characteristics or capability of the telephone base unit. Larsen U.S. Pat. No. 5,058,155 discusses different types of telephone systems, for example Merlin (AT & T) systems in North America and DYAD (Siemens) systems in Europe, each of which presents different operating characteristics to telephone sets. Acree U.S. Pat. No. 5,099,514 and Larsen recognize the desire of some telephone users to have different accessories or the ability to update and change accessories for telephone base units.

Currently, no satisfactory method for accommodating different types of telephone microphones, with their different operating characteristics, is known. Furthermore, no satisfactory method of automatically adjusting for different types of microphones or different types of telephone systems is known. Some of the foregoing mentioned U.S. Patents certainly recognize the different operating characteristics of different types of microphones and disclose methods to attempt to provide for the same. For example, Hanon et al. and Larsen have manual switches that can be operated to attempt to compensate or match different types of microphones to the base unit. Horiuchi has switching circuits to try to match microphones of different operating characteristics to a base unit. Horiuchi appears to teach an automatic switching mechanism, but the switching to match for the different type of microphone occurs by sensing the presence of a headset when a regular handset is in place on the switch-hook.

Therefore, there is a need in the art for an automatic compensating system that is not dependent on sensing the physical connection of different microphones, but rather is based on monitoring the operating characteristics associated with a microphone.

It is therefore a principal object of the present invention to provide an apparatus and method for providing the proper microphone bias current and load resistance for a telephone, regardless of the type of microphone used. Further objects of the invention involve providing an apparatus and method for providing the proper microphone bias current and load resistance for a telephone handset:

a. that do not adversely impact upon the power of the telephone system or telephone base unit, or power needed for operation of the microphone;
 b. that are flexible in their application to almost all types of presently used telephone microphones and telephone systems;
 c. that are economical and efficient;
 d. that can be added to existing telephone sets and used with a wide variety, if not most or all, microphones and telephone base units, handsets and headsets.

These and other objects, features, and advantages of the present invention will become more apparent with reference to the accompanying specification and claims.

SUMMARY OF THE INVENTION

The present invention includes an apparatus which can be connected to a telephone microphone to automatically provide the proper microphone bias current and load resistance. A comparator compares the existing bias voltage, if any, across the microphone to a reference voltage. Two levels of load resistance are provides between the source of bias voltage and one side of the microphone. Also, two levels of impedance are provided between the other side of the microphone to ground.

The comparator controls two switching components. If the measured bias voltage is greater than the reference voltage, the comparator instructs a first switching device to impose a relatively high impedance path to one side of the microphone and instructs the second switching device to likewise impose a relatively high impedance path from the other side of the microphone to ground. On the other hand, if the reference voltage is higher than the measured bias voltage across the microphone, the comparator instructs the first switch to impose a relatively low impedance path to the one side of the microphone and likewise provide a relatively low impedance path from the other side of the microphone to ground.

In this manner, microphones such as carbon-type microphones with a relatively low impedance can be provided with a low impedance path for optimal operation of the microphone. On the other hand, microphones such as electret-type microphones can automatically have a high impedance pathway imposed on both sides of the microphone needed for optimal operation of those types of microphones.

Furthermore, if no bias voltage is present, such as may be the case in certain types of microphone such as certain dynamic-types microphones, the default characteristics of the circuit are that a high impedance pathway will be presented to the microphone. The output signal of the microphone is taken to a microphone conditioning amplifier and therefore if no bias voltage is at the microphone, the microphone and the output circuit are effectively the only elements involved.

DETAILED DESCRIPTION OF THE PREFERRED EMBODIMENT

Figure 1:
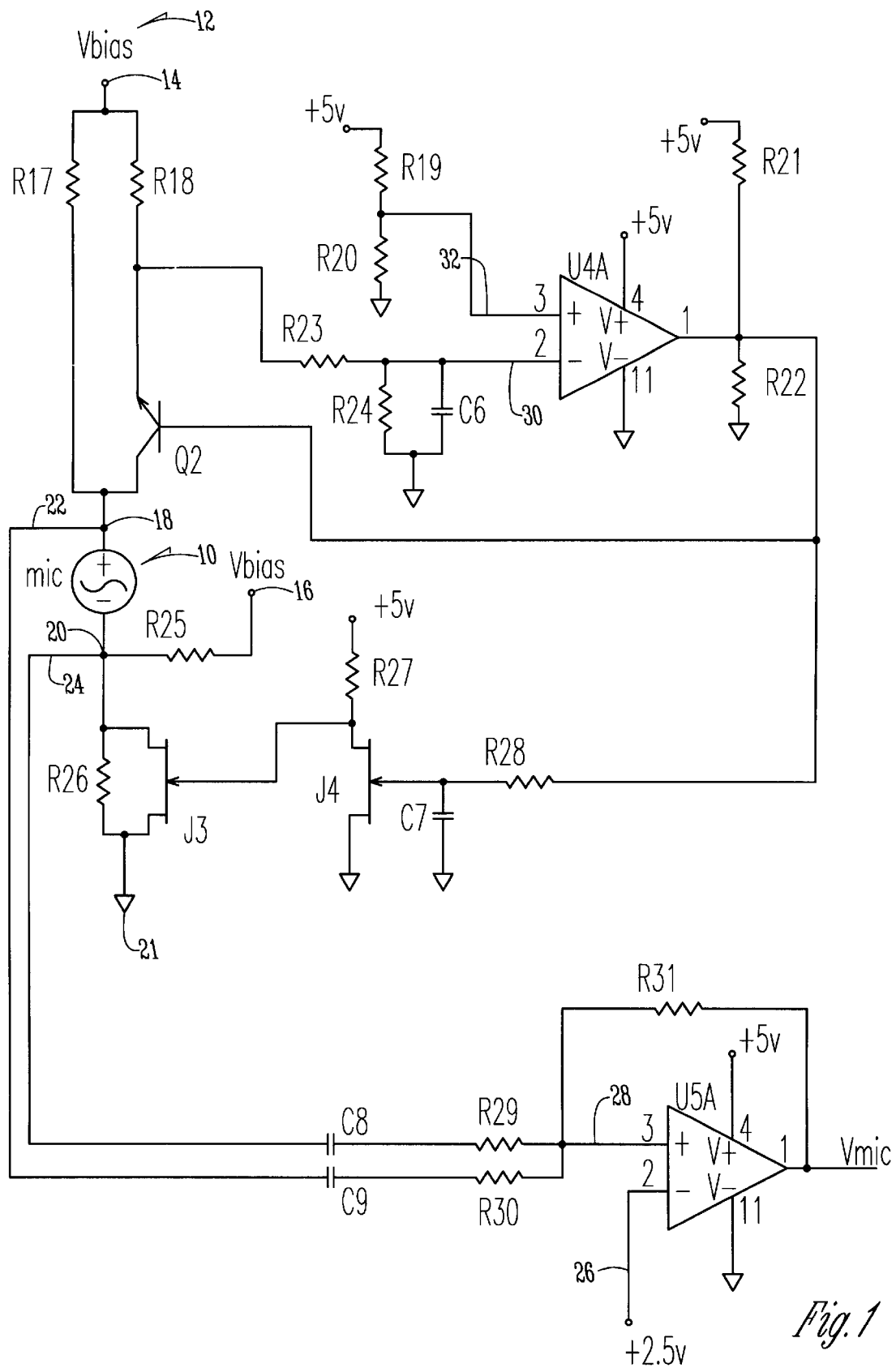
FIG. 1 is an electrical schematic of a circuit according to a preferred embodiment of the invention.

To assist in a better understanding of the invention, one embodiment of the same will now be described in detail.

Reference numerals will be used to indicate certain parts and locations in the drawing.

The drawing, FIG. 1, illustrates a microphone 10 connected to a source of bias voltage 12, terminal 14 and 16 representing the positive connection to that bias voltage source.

FIG. 1 also shows that lines 22 and 24 communicate the output signal of microphone 10 to a microphone output circuit that results in $V_{mic}$ which can be used by the telephone base unit to transmit the converted acoustic energy of the telephone user's voice across the telephone system. In FIG. 1, the microphone output circuit includes amplifier U5A having one input 26 connected to a DC voltage source (e.g. +2.5V) and the other input 28 connected to the output of microphone 10. As can be seen in FIG. 1, various other electrical components are utilized in the microphone output circuit to condition the output signal for use by the telephone base unit.

Between bias voltage terminal 14 and the side 18 to microphone 10 exists two load resistors R17 and R18 in parallel. A switch Q2 (in this instance a transistor) is connected in series with resistor R18 and can essentially switch out resistor R18 from the electrical pathway between bias voltage connection 14 and side 18 of microphone 10.

On the other side 20 of microphone 10, as previously described, resistor R25 is connected in parallel with switching device J3. It is to be understood the resistor R26 has a relatively high resistance value so that it provides a relatively high impedance path from point 20 to ground in a normal state. However, also connected to point 20 on the output side of microphone 10 is switching device J3, that if conducting, presents a low impedance path to ground.

As can been seen in FIG. 1, therefore, if switch Q2 is conducting, both resistor R17 and R18 would be connected in parallel to side 18 of microphone 10. By conventional electrical laws, the lower of the two resistance values of resistors R17 and R18 will predominate with respect to the impedance presented to side 18 of microphone 10. In the present instance, the resistance value of R17 is substantially higher than R18. If Q2 is conducting, therefore, the substantially lower value of R18 will predominate and thus a much lower impedance path between point 14 and point 18 will exist. On the other hand, if switch Q2 is not conducting, only R17 will come into play with respect to impedance on side 18 of microphone 10, and in this instance, the impedance will be substantially higher than when Q2 is conducting because the resistance of R17 is substantially greater than R18.

On the other hand, as previously mentioned, the impedance path between points 20 and ground 21 will be relatively high because of the presence of resistor R26 unless switching device J3 allows current to flow through it to ground 21.

FIG. 1 shows a comparator U4A operable on +5 volts DC and having at input 30 the signal from the bias voltage through resistor R18, resistor R23, and resistor capacitor network R24/C6. Essentially input 30 to comparator U4A is the existing bias voltage level across microphone 10. Input 32 to comparator U4A is reference voltage $V_{ref}$ created by using a voltage using a voltage divider network comprising resistor R19 and resistor R20.

The output of comparator U4A controls the state of switching transistor Q2. As can be seen, the output of comparator of U4A also controls the switching condition of switching device J3 by utilizing a switching network comprising switching device J4 which operates from +5 volts DC in combination with R28, R27 and capacitor C7.

Operation of circuit of FIG. 1 is as follows. Comparator U4A compares the DC voltage dropped across microphone 10 and R25 to a reference voltage created by divider network R19 and R20. If the bias voltage of microphone 10 is greater than the reference voltage at input 32 of comparator U4A, switching transistor Q2 is turned off (is non-conducting). This removes resistor R18 from the bias network. Because the resistance of R17 is much greater than R18, a high impedance load resistor is presented to microphone 10. If switching transistor Q2 is turned off (non-conducting), the switching network J4 and J3 will also result in J3 being turned off(non-conducting). Therefore impedance to ground for microphone 10 is through resistor R26. Thus, upon sensing microphone bias voltage as greater than the reference voltage, comparator U4A puts the circuit in a mode of operation that works with high impedance microphones (such as low current electret-types). In this mode, summing operational amplifier U5A provides a conditioned microphone signal. In three terminal electret type microphones, the bias voltage is provided at node 18 which is also an AC equivalent ground, and microphone output at node 20. Two terminal electret types microphones have bias and output at node 18 with node 20 being microphone ground. The output of summing amplifier U5A is the sum of node 18 and 20, thus the circuit is compatible with both two and three terminal electret microphones.

In comparison, in the case where DC voltage dropped across microphone 10 is below the threshold voltage ($V_{ref}$) of comparator U4A, the switch Q2 is biased on (conducting) and resistor R18 is left connected. Since the resistance of R17 is much greater than that of R18, the parallel combination is approximately the value of the value of R18. This results in a low impedance load resistor being presented to microphone 10. Additionally, switching network J4 and J3 results in J3 being turned on (conducting). Thus the electrical pathway through resistor R26 is effectively shorted and microphone 10 will then see a low resistance path to ground through J3. This mode of operation works for low impedance microphones (for example, carbon and carbon-equivalent types). In this mode, summing operational amplifier U5A provides the conditioned microphone signal. It should be noted that one of the summing inputs is grounded.

In the case of dynamic microphones, no voltage bias is applied and therefore the $V_{bias}$ nodes are high impedance nodes. The equivalent circuit is just microphone 10 and summing operational amplifier circuit U5A.

The included preferred embodiment is given by way of example only, and not by way of limitation to the invention, which is solely described by the claims herein. Variations obvious to one skilled in the art will be included within the invention defined by the claims.

For example, in the preferred embodiment, $V_{bias}$ for a low impedance microphone is well above 2.5 volts. Therefore, in the preferred embodiment, voltage dividing network R19 and R20 take the +5 volt DC input and divide it roughly in half by virtue of R19 being 1,000 ohms and R20 being 910 ohms. Essentially a 2.38 volt reference voltage is accomplished at point 32 of the circuit. Resistor R21 can be 1,000 ohms and R22 approximately 2,200 ohms. Resistor R24 can be 100K ohms and capacitor C6 can be 10 microfarads. Resistor R23 can be 100K ohms.

On the other hand resistor R28 can be 100K ohms, capacitor C7, 10 microfarads, resistor R27, 1K ohm. Resistor R26 can be 1K ohm.

In the preferred embodiment, R18 is 82 ohms and R17 is 3,900 ohms. Capacitors C8 and C9 are 0.1 microfarads, resistors R29 and R30 are 10K ohms, and resistor R31 is 10K ohms.

The values stated above can be altered to the needs of the circuitry such as would be within the skill of those skilled in the art. The value of R17 should not be too large, however, or there is a risk of having significant voltage drop across it, which may limit the amount of voltage across microphone 10.

What is claimed:

1. An apparatus for providing proper microphone bias current and load resistance to a telephone microphone connected between a source of DC bias current and a first impedance path to ground comprising:

a comparator including a first connection that is electrically connectable to a reference voltage source and a second connection that is electrically connectable to the bias current;

first and second load resistance devices connected in parallel to the bias current, the first load resistance device having a substantially greater electrical resistance than the second load resistance device;

a first switching device connected to the output of the comparator and in series with the second resistance device;

a second switching device connected to the output of the comparator and to a second impedance path to ground for the microphone, the second impedance path being lower in impedance than the first impedance path;

microphone output connections;

wherein the comparator closes the first switching device if the bias voltage exceeds the reference voltage so that the second resistance device is removed from parallel with the first resistance device and therefore presents its substantially greater resistance to the microphone to produce high impedance to the microphone, and the second switching device is opened to connect the microphone to the first impedance path to ground;

and wherein the comparator opens the first switching device if the reference voltage exceeds the bias voltage so that the second resistance device is connected in parallel with the first resistance device and therefore presents its substantially less resistance to the microphone to produce relatively low impedance to the microphone and the second switch is closed to connect the microphone to the second impedance path to ground.

2. The apparatus of claim 1 wherein the first switching device is a transistor.

3. The apparatus of claim 1 wherein the second switch comprises a switching circuit including first and second transistors, the first transistor controlling the state of the second transistor, which controls the open and closing of the second impedance path.

4. The apparatus of claim 1 wherein the first resistance device is on the order of ten times greater in resistance than the second resistance device.

5. The apparatus of claim 1 wherein the reference voltage is obtained from an electrical power source.

6. The apparatus of claim 5 wherein the electrical power source provides +5 volts DC.

7. The apparatus of claim 6 wherein the reference voltage is approximately +2.5 volts DC as an output from a voltage divider device connected between the electrical power source and the comparator.

8. The apparatus of claim 1 further comprising a microphone output circuit connected to the output connections.

9. The apparatus of claim 1 wherein the microphone output circuit comprises an operational amplifier.

10. A method of dynamically and automatically determining type of biasing needed for a microphone in any handset connected to a voice communications device and providing proper microphone bias current and load resistance to the microphone connected between a source of DC bias current and a first impedance path to ground, regardless of microphone type in a handset, comprising:

indirectly measuring the amount of DC bias current the microphone will allow through it by measuring bias voltage across the microphone, independent of the voice communications device;

comparing the measured bias voltage to a reference voltage related to bias current needed for different types of microphones;

applying type of biasing of the microphone based on the measured bias voltage across the microphone as follows:

if the bias voltage exceeds the reference voltage, presenting a comparatively high impedance path to the microphone which provides a reduced amount of bias current through the microphone;

if the reference voltage exceeds the bias voltage, presenting a comparatively low impedance path to the microphone which provides more bias current through the microphone than with the comparatively high impedance path;

so that the bias current through the microphone during operation is automatically selected by sensing the operating characteristics of the microphone independent of the voice communications device.

11. The method of claim 10 wherein the reference voltage is on the order of +2.5 volts DC.

12. The method of claim 10 wherein the high impedance path includes high impedance at both the bias voltage to the microphone and on the ground side of the microphone.

13. The method of claim 12 wherein a high impedance path is presented to the microphone by a first resistance.

14. The method of claim 13 wherein a low impedance path is presented to the microphone by a second resistance substantially lower than the first resistance.

15. The method of claim 14 wherein the first and second resistors are connected in parallel between the bias voltage source and the microphone.

16. The method of claim 12 wherein a high impedance path is normally connected to the ground side of the microphone, and is used when high impedance is desired for the microphone.

17. The method of claim 12 wherein low impedance to the ground side of the microphone can be connected to and will override the high impedance path by switching it to the ground side of the microphone.

18. The method of claim 10 further comprising conditioning the output of the microphone.

19. The method of claim 10 wherein proper microphone bias current and load resistance is automatically selected for the microphone.

20. The method of claim 10 wherein various types of microphones can be utilized with proper microphone bias current and load resistance automatically selected to match operating characteristics of the microphone.

21. The method of claim 20 wherein the microphone is selected from the set comprising carbon or carbon equivalent types, electret types, and dynamic types.

22. The method of claim 10 wherein a high impedance pathway is normally provided to the microphone and if no bias voltage is sensed at the microphone, the high impedance pathway is left in place and the microphone and a microphone output conditioning circuit connected to the microphone will represent the equivalent circuit for the microphone.

* * * * *